United States Patent
Kobayashi et al.

(10) Patent No.: US 7,572,015 B2
(45) Date of Patent: Aug. 11, 2009

(54) DISPLAYING OPTICAL SYSTEM AND IMAGE PROJECTION APPARATUS

(75) Inventors: Shuichi Kobayashi, Yokohama (JP); Keiichiro Ishihara, Kanagawa-ken (JP); Ryuichi Sakaguchi, Machida (JP)

(73) Assignee: Canon Kabushiki Kaisha (JP)

( * ) Notice: Subject to any disclaimer, the term of this patent is extended or adjusted under 35 U.S.C. 154(b) by 536 days.

(21) Appl. No.: 11/204,487

(22) Filed: Aug. 15, 2005

(65) Prior Publication Data

US 2006/0033009 A1 Feb. 16, 2006

(30) Foreign Application Priority Data

Aug. 16, 2004 (JP) ............... 2004-236839

(51) Int. Cl.
*G03B 21/20* (2006.01)
*G03B 21/28* (2006.01)
*H04N 3/02* (2006.01)
*H04N 3/08* (2006.01)
*G02B 26/10* (2006.01)

(52) U.S. Cl. .................... 353/102; 353/98; 348/195; 359/212.1; 359/223.1

(58) Field of Classification Search .............. 353/30, 353/37, 98, 99, 102, 121; 348/195, 203, 348/205; 359/196, 197, 201–203.1, 212, 359/223–226.2, 197.1, 196.1, 212.1, 212.2

See application file for complete search history.

(56) References Cited

U.S. PATENT DOCUMENTS

| 5,220,452 | A | * | 6/1993 | Anderson | .................... 359/462 |
| 5,534,950 | A | | 7/1996 | Hargis et al. | |
| 5,629,801 | A | | 5/1997 | Staker et al. | |
| 5,701,132 | A | * | 12/1997 | Kollin et al. | .................... 345/8 |
| 5,982,553 | A | * | 11/1999 | Bloom et al. | ................ 359/627 |
| 6,323,984 | B1 | | 11/2001 | Trisnadi | |
| 6,897,992 | B2 | | 5/2005 | Kikuchi | |

(Continued)

FOREIGN PATENT DOCUMENTS

JP 6208089 7/1994

(Continued)

OTHER PUBLICATIONS

Wang et al, "Speckle reduction in laser projection systems by diffractive optical elements", Applied Optics, vol. 37, No. 10, Apr. 1, 1998, pp. 1770-1775.

(Continued)

*Primary Examiner*—Rochelle-Ann J Blackman
(74) *Attorney, Agent, or Firm*—Rossi, Kimms & McDowell LLP (57) ABSTRACT

A displaying optical system is disclosed, which is capable of reducing a speckle noise. The displaying optical system comprises a light source emitting coherent light, a scanning device scanning the light, a first optical system causing the light from the scanning device to form an intermediate image, a second optical system causing the light from the intermediate image to form an image on a real display surface, and an optical element arranged between the first and second optical systems. The optical element widens the divergence angle of the light emerged from the optical element toward the second optical system more than the incident angle of the light on the optical element from the first optical system.

21 Claims, 11 Drawing Sheets

U.S. PATENT DOCUMENTS

2004/0109219 A1 * 6/2004 Kikuchi ..................... 359/246

FOREIGN PATENT DOCUMENTS

| JP | 07-151995 | 6/1995 |
| JP | 7151995 | 6/1995 |
| JP | 09-504920 | 5/1997 |
| JP | 10-510373 | 10/1998 |
| JP | 10-301057 | 11/1998 |
| JP | 11-101925 | 4/1999 |
| JP | 2000206449 | 7/2000 |
| JP | 2004-151133 | 5/2004 |

OTHER PUBLICATIONS

Full English Translation of JP 11-101925, Published Apr. 13, 1999.
Full English Translation of JP 10301057, Published Nov. 13, 1998.

* cited by examiner

DISPLAYING OPTICAL SYSTEM AND IMAGE PROJECTION APPARATUS

FIELD OF THE INVENTION

The present invention relates to a displaying optical system which projects images using coherent light (light with coherence) such as a laser beam.

BACKGROUND OF THE INVENTION

Various image projection apparatuses which project images using a laser beam have been proposed. Since the laser beam has a very narrow spectral width, it is possible to provide a display having a wide range of color reproduction by using three colored lasers of red, blue, and green.

Since laser light has a strong directivity and its energy density can be heightened, it is possible to perform beam-formation of the light from the laser source and scan the laser beam by a compact scanning device. Therefore, there is a possibility of realizing a compact image projection apparatus. For example, Japanese Patent Laid-Open No. H07-151995 has disclosed a laser scanning display in which a scanning device scans a laser beam to display images on a screen as an image projection apparatus which projects images using a laser beam.

There is a MEMS(Micro Electro Mechanical System) device which is manufactured using semiconductor manufacturing techniques as a scanning device; the MEMS device can operate at a high speed while it is a compact and lightweight device.

On the other hand, since the laser beam has high coherence, an interference pattern, which is called a "speckle noise" and caused by the roughness of the screen, appears when the laser beam is projected on the screen. The interference pattern causes degradation of sharpness of the image displayed by the image projection apparatus.

A method for reducing the speckle noise has been disclosed in Japanese Patent Laid-Open No. 2000-206449, in which a transparent optical element having a refraction index of "n" and including "N" areas whose thicknesses change by "Δt" is used. In the method, laser light that is a diverging luminous flux from a semiconductor laser (laser diode) is converted into a parallel luminous flux by a collimator lens, and enters the transparent optical element. The transparent optical element gives optical path differences "(n-1)Δt" to luminous fluxes (divided luminous flux) passing through portions with different thicknesses, thereby reducing the coherence of each divided luminous flux. It is possible to reduce the speckle noise by overlapping the incoherent luminous fluxes that have passed through the transparent optical element by a lens.

Further, a method for reducing the speckle noise has been disclosed in Japanese Patent Laid-Open No. H06-208089, in which a laser beam is scattered with a rotatable diffusing element. The speckle pattern is changed at a speed undetectable to human's eyes by the rotation of the diffusing element. Overlapping the speckle patterns changing at a high speed by an afterimage effect of the human's eye makes it possible to reduce the speckle noise.

Moreover, a method for reducing the speckle noise has been disclosed in "Applied Optics/Vol.37, No.10/1 April 1998 'Speckle reduction in laser projection system by diffractive optical elements'", in which a diffraction grating is used and the diffracted light components are overlapped.

Furthermore, a laser display with a one-dimensional diffractive light modulator has been disclosed in U.S. Pat. No. 6,323,984. In the laser display, a phase modulator is arranged at a position conjugated with a light modulator to change the phase of the light. Thereby, the speckle noise is reduced.

However, in the method disclosed in Japanese Patent Laid-Open No. 2000-206449, it is necessary to increase the step "Δt" of the transparent optical element to give enough optical path differences to the divided luminous fluxes. As a result, it becomes difficult to downsize the optical system. In particular, the size of the transparent optical element becomes larger when using light having a long coherence length such as a solid-state laser and a single-mode semiconductor laser.

Further, in the method disclosed in Japanese Patent Laid-Open No. H06-208089, the loss of light amount becomes relatively large because the laser beam is transmitted through the diffusing element (frosted glass).

Moreover, in the method disclosed in U.S. Pat. No. 6,323,984, the optical system becomes complex because the phase modulator is arranged at the position conjugated with the light modulator.

Furthermore, in the methods disclosed in Japanese Patent Laid-Open No. H06-208089 and "Applied Optics/Vol.37 No.10/1 April 1998", a spatial light modulator is required for projecting an image of a two-dimensional or one-dimensional light modulator.

BRIEF SUMMARY OF THE INVENTION

One object of the present invention is to provide a compact displaying optical system capable of reducing the speckle noise and a loss of light amount.

A displaying optical system as one aspect of the present invention comprises a light source which emits coherent light, a scanning device which scans the light, a first optical system which causes the light from the scanning device to form an intermediate image, a second optical system which causes the light from the intermediate image to form an image on a real display surface, and an optical element arranged between the first and second optical systems. The optical element widens the divergence angle of the light emerged from the optical element toward the second optical system more than the incident angle of the light on the optical element from the first optical system.

A displaying optical system as another aspect of the present invention comprises a light source which emits coherent light, a scanning device which scans the light, a first optical system which causes the light from the scanning device to form an intermediate image, a second optical system which causes the light from the intermediate image to form an image on a real display surface, and an optical element arranged between the first and second optical systems. The optical element increases the numerical aperture of the second optical system on its incident side more than that of the first optical system on its emergent side.

A displaying optical system as still another aspect of the present invention comprises a light source which emits coherent light, a scanning device which scans the light, a first optical system which causes the light from the scanning device to form an intermediate image, a second optical system which causes the light from the intermediate image to form an image on a real display surface, and an optical element arranged between the first and second optical systems. The optical element generates plural light components that impinge on the display surface and have divergence angles different from each other.

Other objects and further features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

Figure 1:
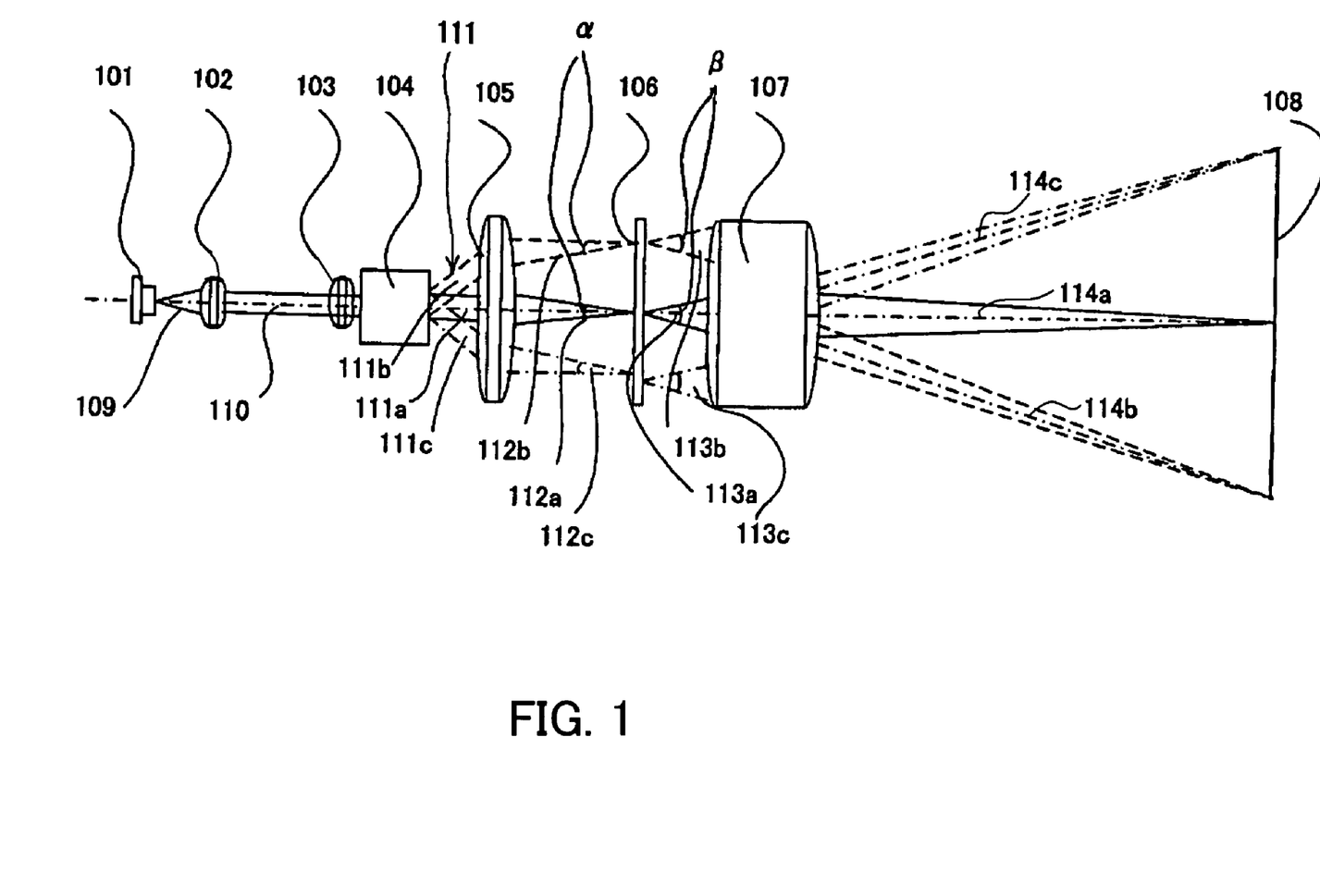
FIG. 1 is a schematic block diagram showing the displaying optical system used for the image projection apparatus that is Embodiment 1 of the present invention.
Figure 2:
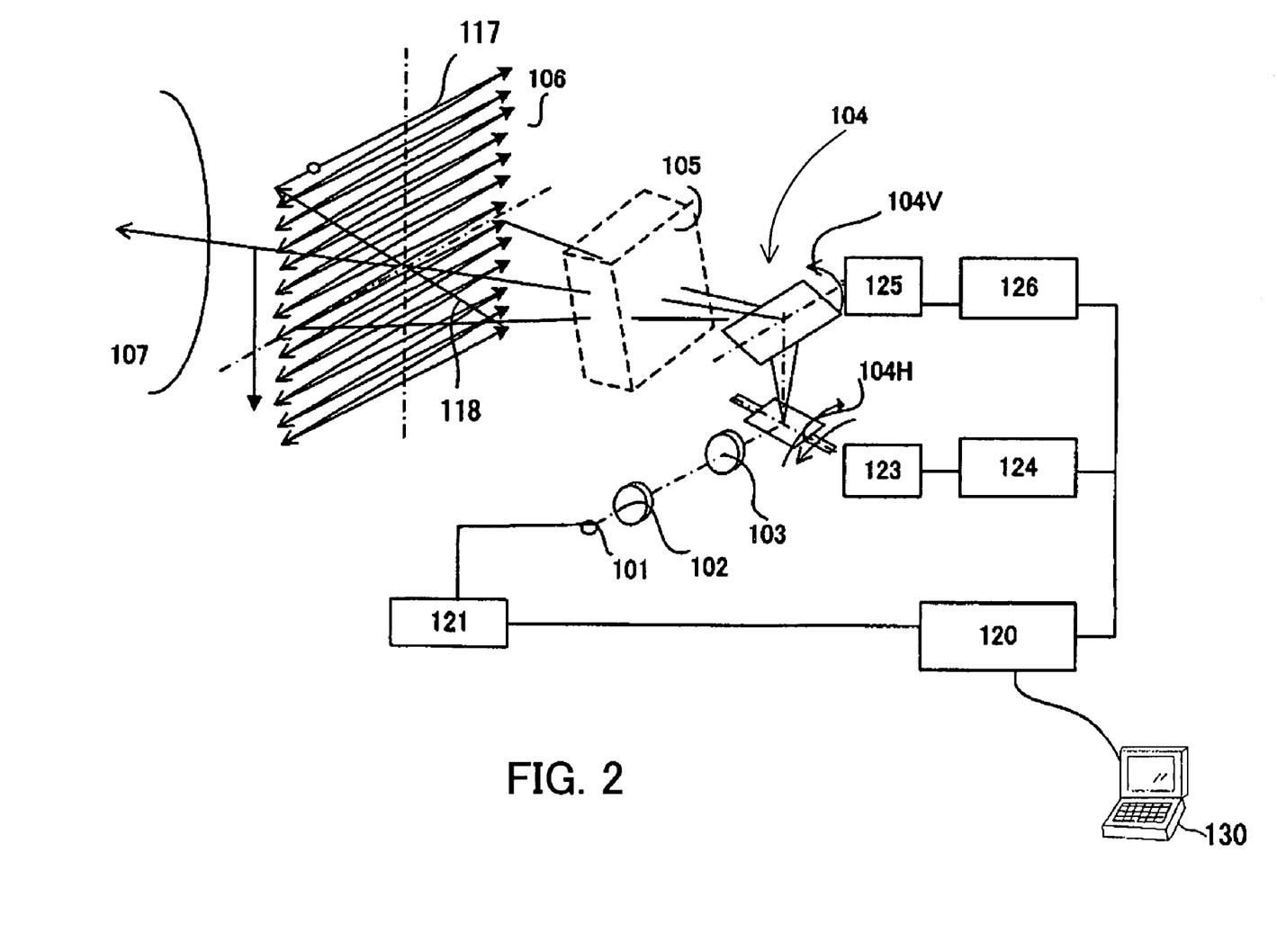
FIG. 2 is an explanatory diagram showing the displaying optical system in Embodiment 1.

FIGS. 1 and 2 show the schematic structure of a laser scanning displaying optical system for an image projection apparatus that is Embodiment 1 of the present invention. FIG. 1 is a development view of the optical system shown in FIG. 2, the optical system being extended linearly in its optical axis direction in FIG. 1.

In FIGS. 1 and 2, reference numeral 101 denotes a laser source which is a light source emitting coherent light. The luminous flux 109 emitted from the laser source 101 is converted into a substantially parallel beam (hereinafter, it is referred to as a laser beam) 110 by a collimator optical system 102 as shown in FIG. 1.

A light-source modulator 121 is connected to the laser source 101. A projection controlling circuit 120 is connected to the light-source modulator 121. An image-signal supplying apparatus 130 such as a personal computer, DVD player, videocassette recorder, or television tuner is connected to the projection controlling circuit 120 to constitute an image displaying system. The projection controlling circuit 120 modulates the intensity of the laser light which is emitted from the laser source 101 according to image signals from the image-signal supplying apparatus 130 via the light-source modulator 121. This configuration is also applied to the following embodiments.

The laser beam 110 emerged from the collimator optical system 102 enters a condensing optical system 103, and then impinges on a two-dimensional scanning device 104. The two-dimensional scanning device 104 scans the laser beam 111 at a high speed in predetermined two-dimensional directions.

The two-dimensional scanning device 104 is constituted by a horizontal scanning mirror 104H and a vertical scanning mirror 104V, and scans the laser beam 111 by their rotations in the directions shown by the arrows in FIG. 2. In this embodiment, a MEMS (Micro Electro Mechanical System) mirror device which is manufactured using semiconductor manufacturing techniques is used as the horizontal scanning mirror 104H. The device can perform a reciprocating rotational motion (resonant oscillation) of a mirror by using electromagnetic force or the like. The mirror surface of the horizontal scanning mirror 104H has a very small size of 1.5 mm square. In contrast, a galvanometer mirror is used as the vertical scanning mirror 104V in this embodiment.

In addition, the present embodiment uses the horizontal scanning mirror 104H and the vertical scanning mirror 104V, each deflecting (scanning) the laser beam in a one-dimensional direction. However, a MEMS mirror device which oscillates a single mirror in two-dimensional directions may be used.

In this embodiment, the horizontal scanning mirror 104H scans the laser beam 111 at a frequency of approximately 20 kHz in the horizontal direction, and the vertical scanning mirror 104V scans the laser beam 111 at a frequency of approximately 60 Hz in the vertical direction. In FIG. 2, reference numeral 117 denotes scanning lines, and 118 a fly-back line.

A horizontal driving circuit 123 such as a magnet coil is connected to the horizontal scanning mirror 104H, and a horizontal controlling circuit 124 is connected to the horizontal driving circuit 123, the controlling circuit 124 controlling the driving circuit 123. A vertical driving circuit 125 such as a motor is connected to the vertical scanning mirror 104V, and a vertical controlling circuit 126 is connected to the vertical driving circuit 125, the controlling circuit 126 controlling the driving circuit 125.

The projection controlling circuit 120 drives the horizontal scanning mirror 104H and the vertical scanning mirror 104V in synchronization with the image signal via the horizontal and vertical controlling circuits 124 and 126. This configuration is also applied to the following embodiments.

FIG. 1 exemplifies the laser beams 111a, 111b and 111c, which are three of the laser beams scanned by the two-dimensional scanning device 104 and exist on the paper of this figure.

The laser beams 111a, 111b, and 111c enter a first projection optical system 105 that is a first optical system. The first projection optical system 105 causes the laser beams 111a, 111b, and 111c to form an intermediate image on a divergence-angle conversion element 106 or the vicinity thereof.

The divergence-angle conversion element 106 widens the divergence angle (conic angle) α of the laser beams 112a, 112b, and 112c that entered the element to produce laser luminous fluxes 113a, 113b, and 113c with a divergence angle of β which is larger than α. In other words, the numerical aperture of the after-mentioned second optical system on its entering side is increased more than that of the first projection optical system 105 on its emergent side.

The laser luminous fluxes 113a, 113b, and 113c enter a second projection optical system 107 that is a second optical system, and then reach a scanned surface 108 that is a real display surface observed by a user, such as a screen. In other words, the image projection apparatus of this embodiment enlarges and projects the intermediate images, which are formed on the divergence-angle conversion element 106 or the vicinity thereof, on the scanned surface 108 through the second projection optical system 107.

Figure 3:
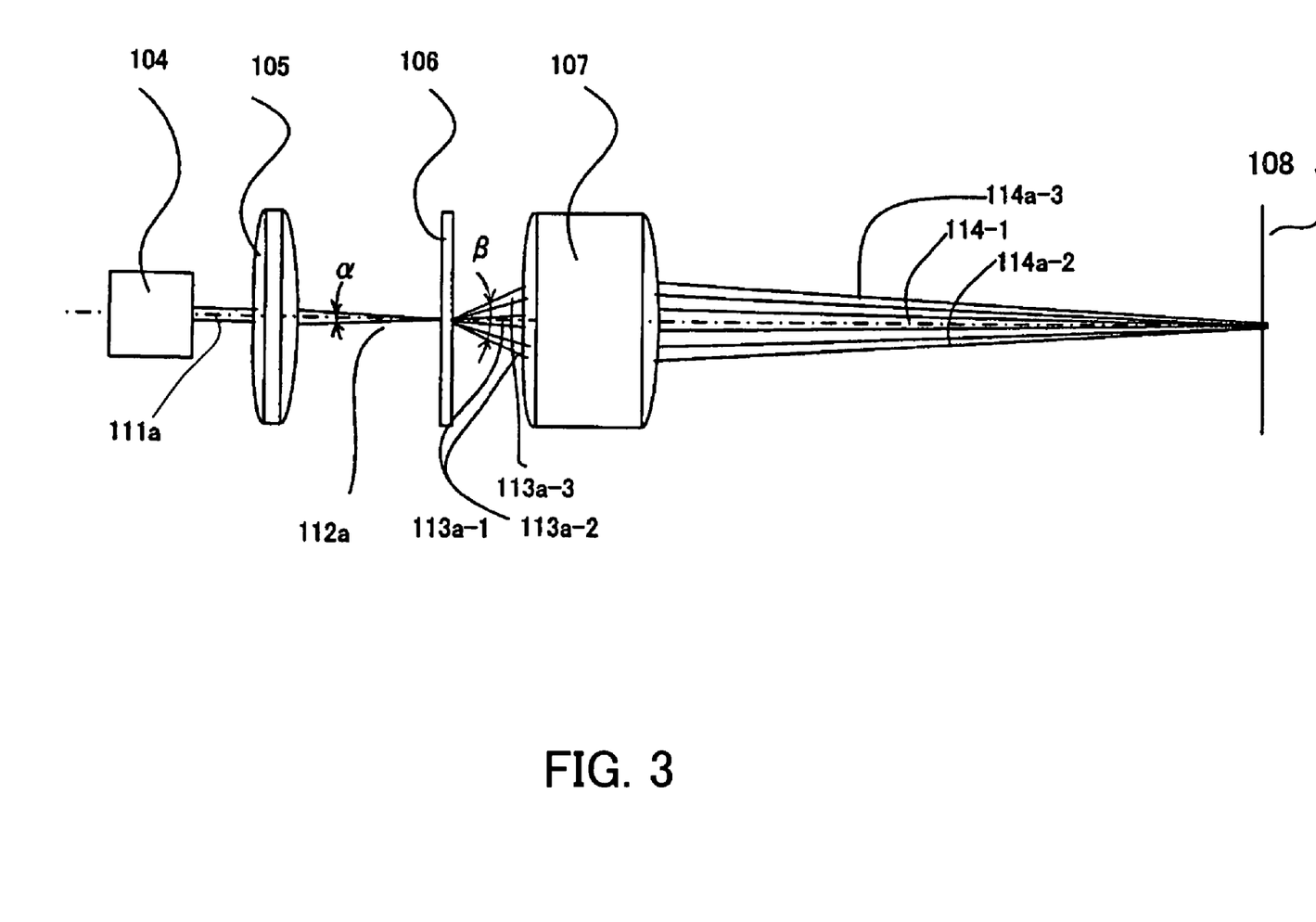
FIG. 3 is an explanatory diagram showing the displaying optical system in Embodiment 1.

The description will hereinafter be given of the principle of speckle noise reduction in this embodiment. FIG. 3 is a diagram for explaining the function of the divergence-angle conversion element 106, the figure showing the optical path from the two-dimensional scanning device 104 to the scanned surface 108.

The laser beam 112a with a conic angle of α is converted into the laser luminous flux 113a with a conic angle of β by the divergence-angle conversion element 106.

In this embodiment, the divergence-angle conversion element 106 is constituted by a microlens array, and discretely widens the entering luminous flux by its diffraction effect.

FIG. 3 shows the zeroth-order diffracted light component 113a-1 of the diffracted light components of the laser beam 112a, and the ± first-order diffracted light components 113a-2 and 113a-2 in the paper of this figure.

These diffracted light components 113a-1, 113a-2, and 113a-3 progress to the scanned surface 108 through the second projection optical system 107. The diffracted light components 114a-1, 114a-2, and 114a-3 emerged from the second projection optical system 107 have different incident angles on the scanned surface 108. Therefore, plural diffracted light components with different incident divergence angles (convergence angles) impinge on the scanned surface 108. Thereby, plural speckle patterns different from each other, which are formed by the diffracted light components, are overlapped and observed by the user. This makes it possible to reduce the speckle noise.

In this embodiment, the divergence-angle conversion element 106 and the scanned surface 108 have a conjugate relationship optically. In this configuration, optimizing the pitch of the microlens array that constitutes the divergence-angle conversion element 106 realizes displaying images with a small deterioration of resolution.

Figure 4:
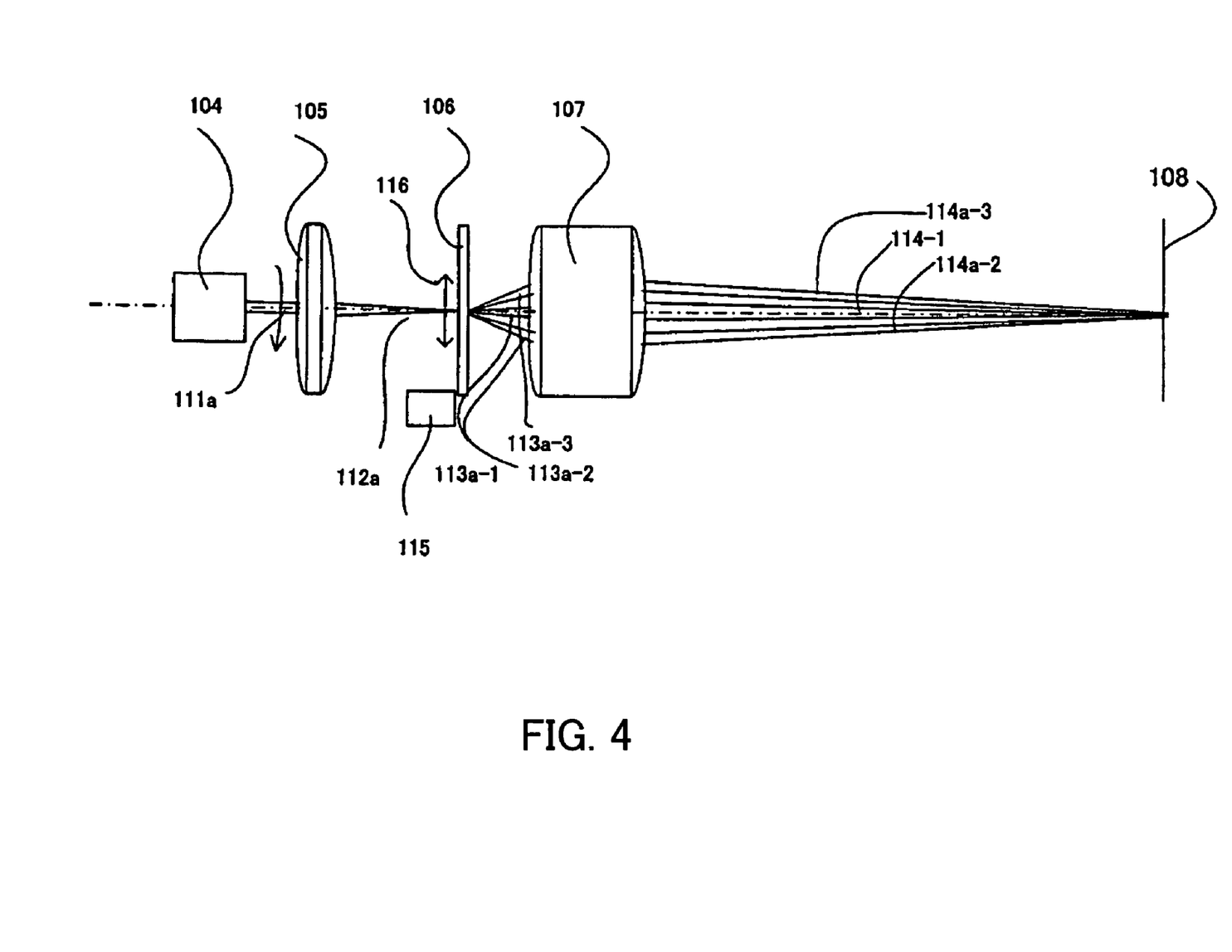
FIG. 4 is an explanatory diagram showing a displaying optical system as a modified example of Embodiment 1.

FIG. 4 shows a modified example of the present embodiment. The divergence-angle conversion element 106 in FIG. 4 is movable in the direction shown by the arrow 116, the direction being substantially orthogonal to the traveling direction of the laser beam 112a. The divergence-angle conversion element 106 is driven continuously in the above-mentioned direction by a driving mechanism 115.

In a case where the frame rate is 60 Hz, it is preferable to set the driving speed of the divergence-angle conversion element 106 so that the speckle pattern may change within approximately 1/30 seconds that is the afterimage time of human eyes. However, it is necessary to set the driving speed so that the change period of the speckle pattern may not become an integral multiple of the frame rate.

Although the configuration shown in FIG. 3 reduces the speckle noise using the diffraction effect of the divergence-angle conversion element 106, the configuration shown in FIG. 4 reduces the speckle noise by driving the divergence-angle conversion element 106 in the direction shown by the arrow 116 with the driving mechanism 115. The drive of the divergence-angle conversion element 106 in the above-mentioned direction changes the conic angle (convergence angle), which is a divergence angle, of the luminous flux impinging on the scanned surface 108 temporally, and thereby the speckle pattern is changed dynamically. Therefore, it is possible to reduce the speckle noise by the temporal overlap of the speckle patterns.

The motion of the divergence-angle conversion element 106 is not limited to the reciprocating motion in the above-mentioned direction, and may be a rotary motion or the like in the plane of the divergence-angle conversion element 106.

Figure 5:
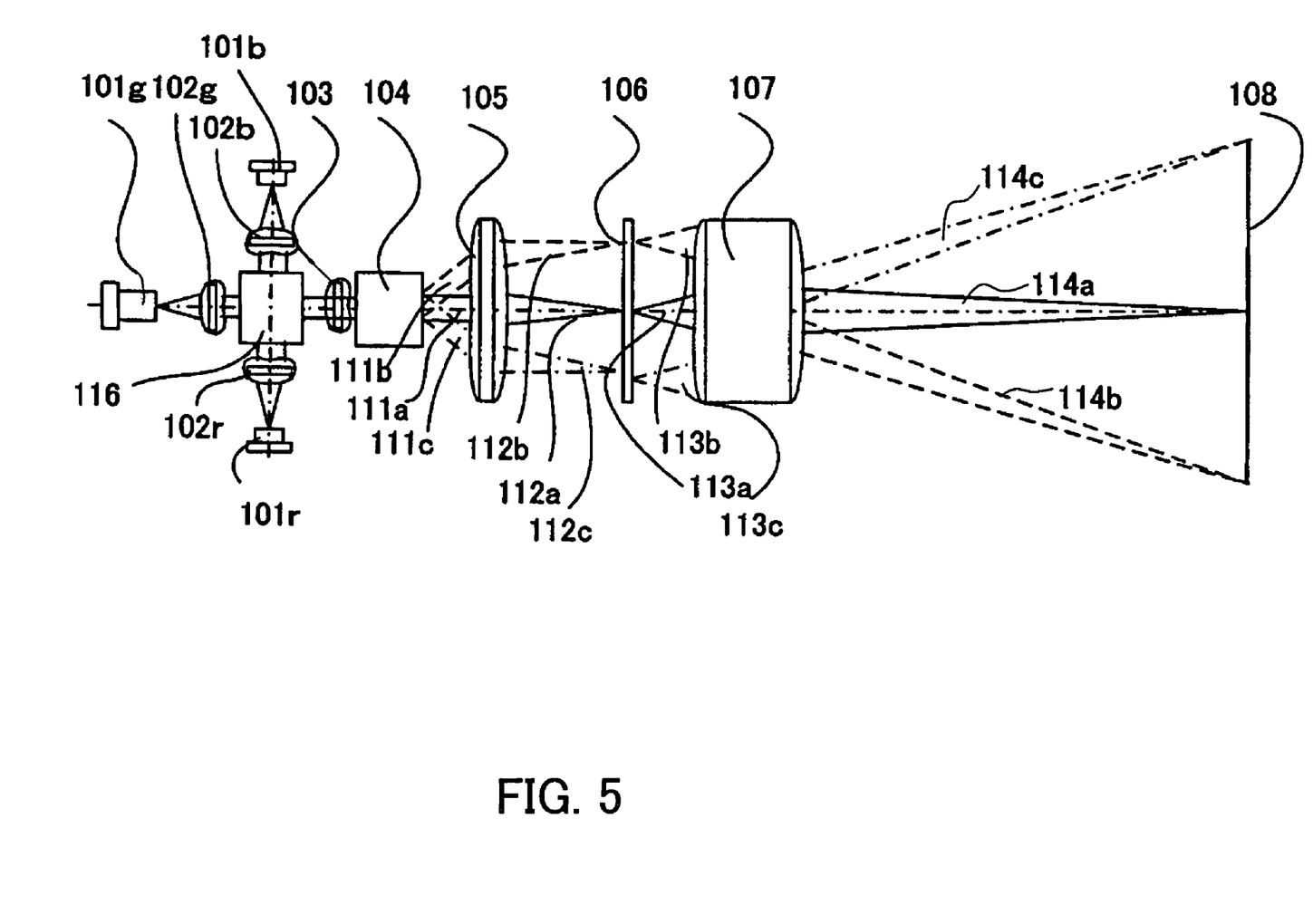
FIG. 5 is an explanatory diagram showing a displaying optical system as another modified example of Embodiment 1.

Although the explanation was made of the case where the laser source 101 is one laser source in this embodiment, three laser sources which includes a red laser source 101r, blue laser source 101b and green laser source 101g may be used as shown in FIG. 5. In this case, the laser beams from the three laser sources 101r, 101b and 101g are combined by a color combining optical system 116 such as a cross-dichroic prism, and the combined laser beam is led to the condensing optical system 103, scanning device 104, first projection optical system 105, divergence-angle conversion element 106 and second projection optical system 107. Thereby, it is possible to realize a laser scanning displaying optical system capable of projecting full-color images.

In this case, semiconductor laser sources or wavelength conversion laser sources with a nonlinear optical element may be used as the three laser sources. These laser sources can be modulated directly. In addition, a color combining diffraction grating can be used as the color combining optical system 116. Moreover, each color laser source may include plural laser sources.

Further, although the explanation was made of the case where a microlens array is used as the divergence-angle conversion element 106 in this embodiment, the present invention is not limited thereto. A one-dimensional or two-dimensional diffraction grating, a hologram element or a diffusing element or the like can be used as the divergence-angle conversion element.

Furthermore, although the explanation was made of the case where the first and second optical systems 105 and 107 are transmissive members, the present invention is not limited thereto. Any optical system having a function to produce an intermediate image can be used as the first optical system, and any optical system having a function for establishing a conjugate relationship between the scanned surface and the divergence-angle conversion element can be used as the second optical system.

Embodiment 2

Figure 6:
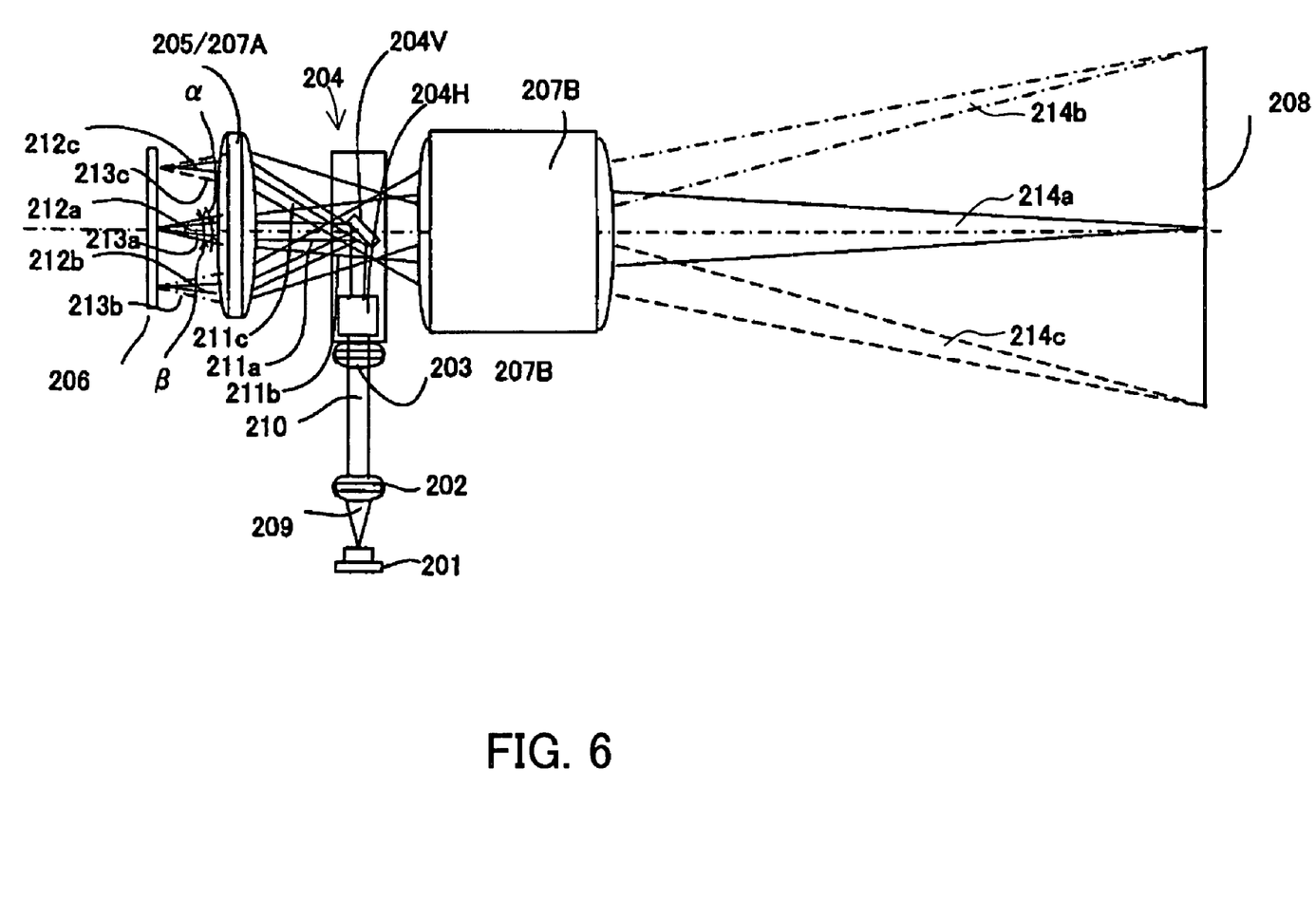
FIG. 6 is a schematic block diagram showing the displaying optical system used for the image projection apparatus that is Embodiment 2 of the present invention.

FIG. 6 shows the schematic structure of a laser scanning displaying optical system for an image projection apparatus that is Embodiment 2 of the present invention. This embodiment uses a reflective divergence-angle conversion element 206 though Embodiment 1 uses a transmissive divergence-angle conversion element 106.

In FIG. 6, reference numeral 201 denotes a laser source which is a light source emitting coherent light. The luminous flux 209 emitted from the laser source 201 is converted into a substantially parallel laser beam 210 by a collimator optical system 202. The laser beam 210 emerged from the collimator optical system 202 enters a condensing optical system 203, and then impinges on a two-dimensional scanning device 204. The two-dimensional scanning device 204 scans the laser beam 210 at a high speed in predetermined two-dimensional directions. FIG. 6 exemplifies the laser beams 211a, 211b and 211c, which are three of the laser beams scanned by the two-dimensional scanning device 204 and exist on the paper of this figure.

The laser beams 211a, 211b, and 211c enter a scanning optical system 205 that is a first optical system to form laser beams 212a, 212b, and 212c. The scanning optical system 205 causes the laser beams 212a, 212b, and 212c to form an intermediate image on a divergence-angle conversion element 206 or the vicinity thereof.

The divergence-angle conversion element 206 widens the divergence angle (conic angle) α of the laser beams 212a, 212b, and 212c that entered the element to produce laser luminous fluxes 213a, 213b, and 213c with a divergence angle of β which is larger than α.

The laser luminous fluxes 213a, 213b, and 213c reflected on the divergence-angle conversion element 206 are transmitted through a projection optical system 207 (207A and 207B) that is a second optical system, and then reach a scanned surface 208 that is a real display surface observed by a user, such as a screen. The scanning optical system 205 and a part 207A of the projection optical system 207 constitute a single optical system which has two functions.

The two-dimensional scanning device 204 is constituted by a horizontal scanning mirror 204H and a vertical scanning mirror 204V as Embodiment 1. In this embodiment, the vertical scanning mirror 204V is arranged at the aperture stop position of the projection optical system 207 (207A and 207B). The image forming method of this embodiment is the same as Embodiment 1 (FIG. 2), and the description thereof is omitted.

Figure 7:
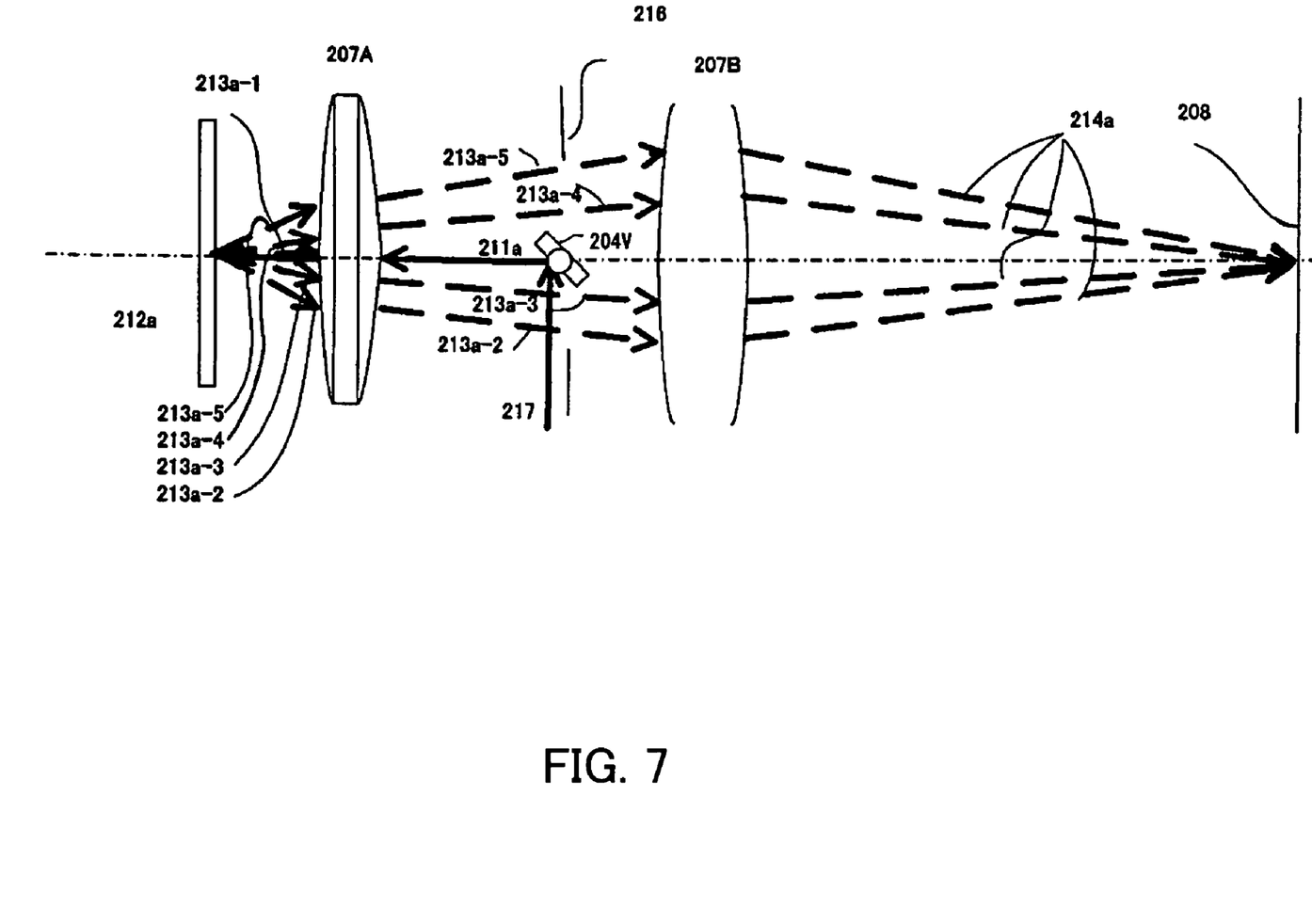
FIG. 7 is an explanatory diagram showing the displaying optical system in Embodiment 2.

FIG. 7 is a diagram for explaining the optical path of the displaying optical system of this embodiment, the figure showing the optical path of the laser beam, which emerged from the horizontal scanning mirror 204H of the two-dimensional scanning device 204, from the vertical scanning mirror 204V to the scanned surface 208.

The luminous flux 217 which impinged on the vertical scanning mirror 204V is deflected (scanned) and progresses in the direction shown by the arrow 211a, and then is transmitted through the scanning optical system 205. The laser beam 212a formed by the scanning optical system 205 enters the reflective divergence-angle conversion element 206.

The divergence-angle conversion element 206 is constituted by a diffraction grating as Embodiment 1, and reflects the laser beam 212a to produce diffracted light components 213a-1, 213a-2, 213a-4, and 213a-5. The diffracted light components 213a-2, 213a-4, and 213a-5 other than the specular reflection component 213a-1 form images on the scanned surface 208 through the projection optical system 207B without being deflected by the vertical scanning mirror 204V.

Figure 8:
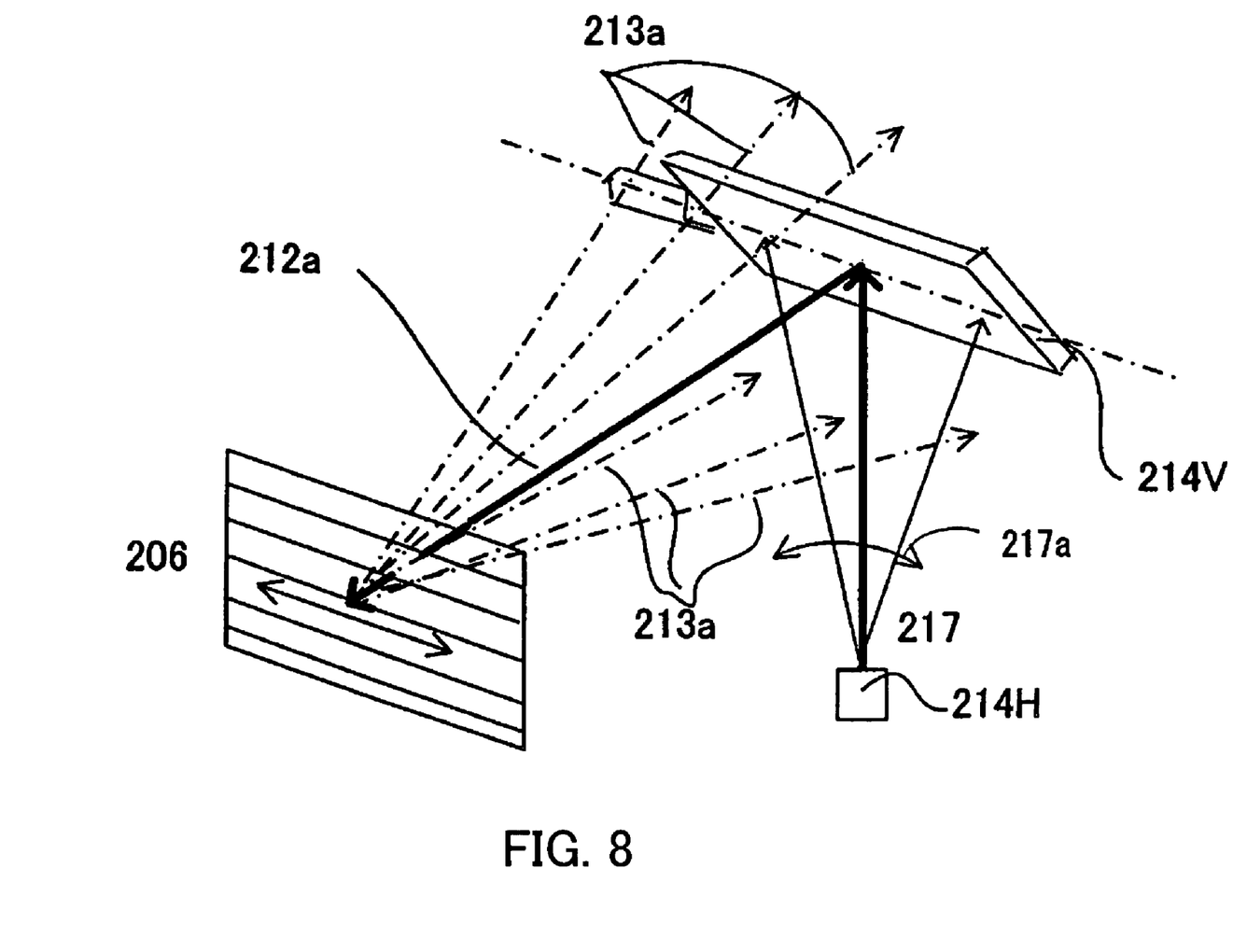
FIG. 8 is an explanatory diagram showing the displaying optical system in Embodiment 2.

FIG. 8 shows the optical path of FIG. 7 stereoscopically. The laser beam 217 is scanned by the vertical scanning mirror 204V in the direction shown by the arrow 217a in the figure. The vertical scanning mirror 204V has an area extending in the horizontal direction. The heavy line in the figure shows a state in which the laser beam 217 is scanned at a specific angle. The laser beam 217 is deflected by the vertical scanning mirror 204V, and progresses toward the direction of the divergence-angle conversion element 206. The laser beam 217 is diffused on the divergence-angle conversion element 206 by its diffraction effect, and becomes plural diffracted light components as shown by the dashed line in the figure. Though a part of the diffracted light components is reflected again by the vertical scanning mirror 204V, many of the diffracted light components reach the scanned surface 208 without being reflected by the vertical scanning mirror 204V.

In this embodiment, it is possible to widen the conic angle, which is a divergence angle (convergence angle), of the luminous flux impinging on the scanned surface 208 by the divergence-angle conversion element 206. Consequently, many speckle patterns are overlapped, thereby making it possible to reduce the speckle noise.

Furthermore, since the displaying optical system of this embodiment uses the reflective divergence-angle conversion element 206, it is possible to miniaturize the displaying optical system compared to a case where a transmissive divergence-angle conversion element is used.

Figure 9:
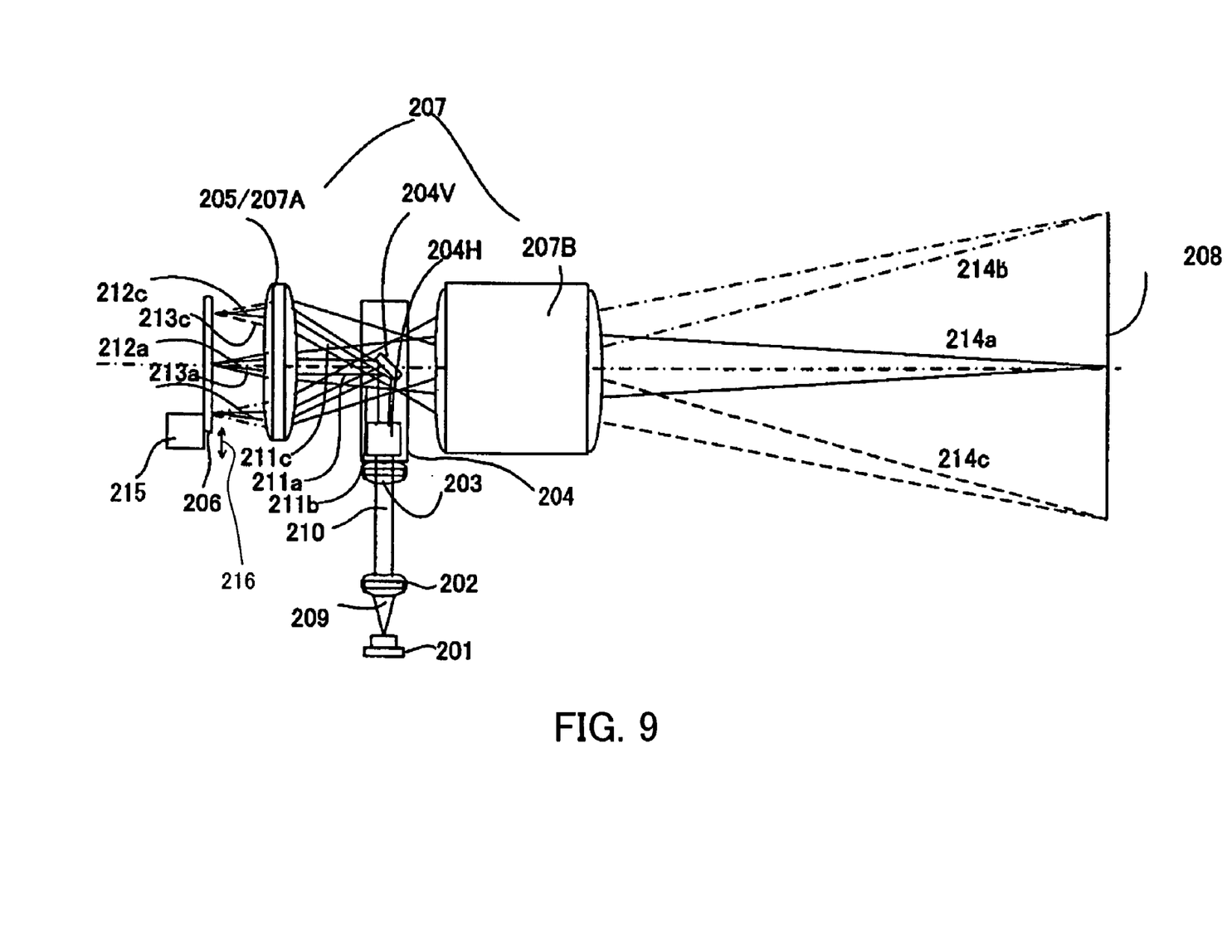
FIG. 9 is an explanatory diagram showing a displaying optical system as a modified example of Embodiment 2.

Although the configuration shown in FIG. 6 reduces the speckle noise using the diffraction effect of the divergence-angle conversion element 206, the configuration shown in FIG. 9 reduces the speckle noise by driving the divergence-angle conversion element 206 in the direction shown by the arrow 216 with the driving mechanism 215. The drive of the divergence-angle conversion element 206 in the above-mentioned direction changes the conic angle (convergence angle), which is a divergence angle, of the luminous flux impinging on the scanned surface 208 temporally, and thereby the speckle pattern is changed dynamically. Therefore, it is possible to reduce the speckle noise by the temporal overlap of the speckle patterns.

The motion of the divergence-angle conversion element 206 is not limited to the reciprocating motion in the above-mentioned direction, and may be a rotary motion or the like in the plane of the divergence-angle conversion element 206.

Although the explanation was made of the case where the laser source 201 is one laser source in the above-mentioned embodiment, three laser sources of red, blue and green may be used. In this case, the laser beams from the three laser sources are combined by a color combining optical system such as a cross-dichroic prism, and the combined laser beam is led to the condensing optical system 203 and the optical systems posterior thereto. Thereby, it is possible to realize a laser scanning displaying optical system capable of projecting full-color images.

Further, although the explanation was made of the case where a microlens array is used as the divergence-angle conversion element 206 in this embodiment, the present invention is not limited thereto. A one-dimensional or two-dimensional diffraction grating, a hologram element or a diffusing element or the like can be used as the divergence-angle conversion element.

In addition, this embodiment uses the horizontal scanning mirror 104H and the vertical scanning mirror 104V as the two-dimensional scanning system. However, a MEMS mirror device which oscillates a single mirror in a two-dimensional direction may be used.

In this embodiment, the displaying optical system is a schlieren optical system in which the vertical scanning mirror is arranged at the vicinity of the aperture stop position of the projection optical system so that the luminous flux entering the divergence-angle conversion element and the luminous flux progressing from the divergence-angle conversion element toward the scanned surface may be divided. However, the displaying optical system of the present invention is not limited thereto.

Furthermore, although the explanation was made of the case where the first and second optical systems 205 and 207 are transmissive member, the present invention is not limited thereto. Any optical system having a function to produce an intermediate image can be used as the first optical system, and any optical system having a function for establishing a conjugate relationship between the scanned surface and the divergence-angle conversion element can be used as the second optical system.

Embodiment 3

Figure 10:
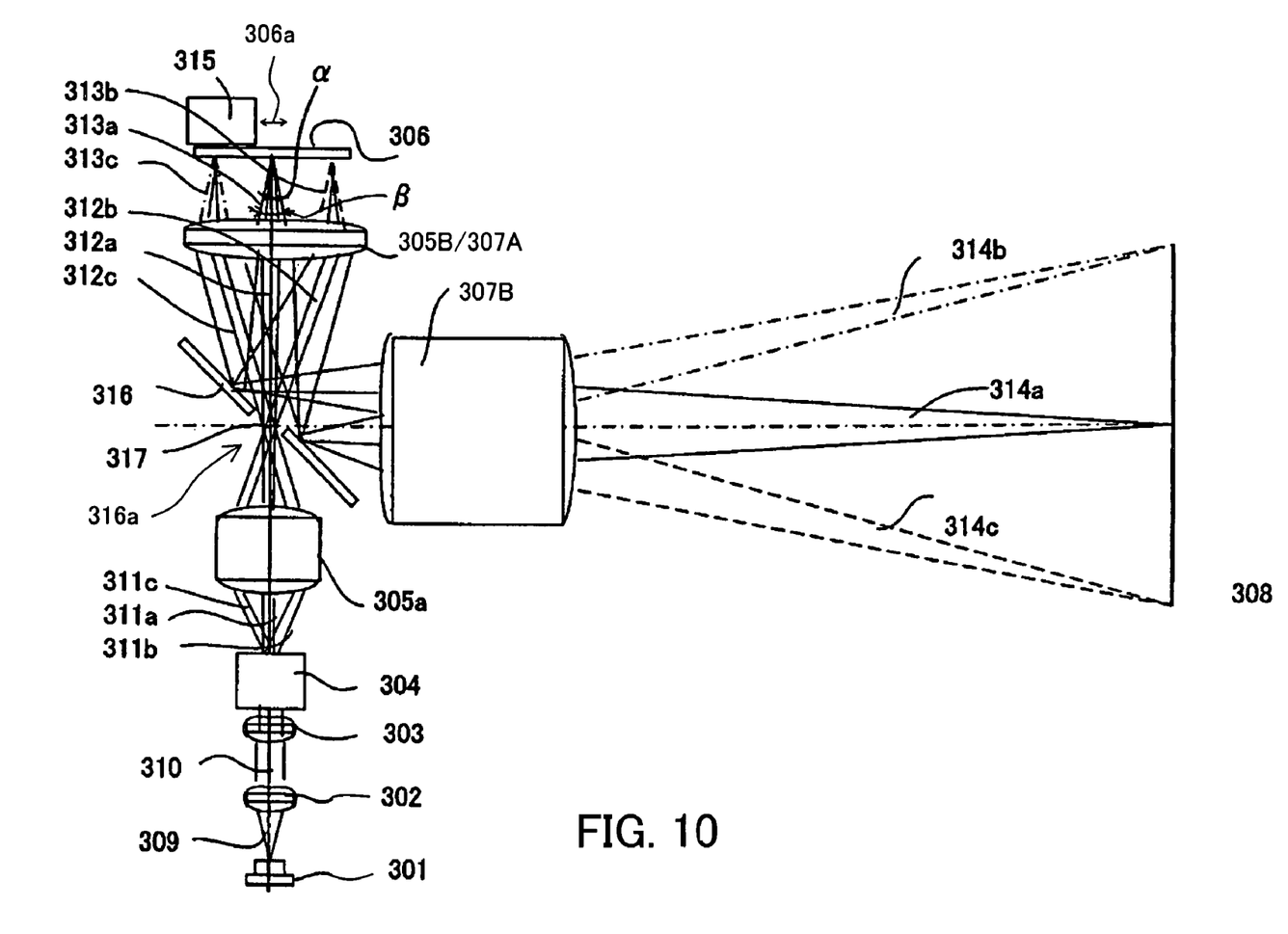
FIG. 10 is a schematic block diagram showing the displaying optical system used for the image projection apparatus that is Embodiment 3 of the present invention.

FIG. 10 shows the schematic structure of a laser scanning displaying optical system for an image projection apparatus that is Embodiment 3 of the present invention. This embodiment uses a reflective divergence-angle conversion element as Embodiment 2. However, the configuration of the scanning optical system is different from that of Embodiment 2.

In FIG. 10, reference numeral 301 denotes a laser source which is a light source emitting coherent light. The luminous flux 309 emitted from the laser source 301 is converted into a substantially parallel laser beam 310 by a collimator optical system 302. The laser beam 310 emerged from the collimator optical system 302 enters a condensing optical system 303, and then impinges on a two-dimensional scanning device 304. The two-dimensional scanning device 304 scans the laser beam 310 at a high speed in predetermined two-dimensional directions. FIG. 10 exemplifies the laser beams 311a, 311b and 311c, which are three of the laser beams scanned by the two-dimensional scanning device 304 and exist on the paper of this figure.

The laser beams 311a, 311b, and 311c enter a first scanning optical system 305A.

The first scanning optical system 305A is an optical system for forming a conjugate point 317 that is substantially conjugated with the scanning point (reflective surface) of the two-dimensional scanning device 304. The laser beam 312a, 312b, and 312c have passed through the conjugate point 317 and entered a second scanning optical system 305B that is a first optical system form an intermediate image on a reflective divergence-angle conversion element 306 or the vicinity thereof. The first scanning optical system 305A and the second optical system 305B compose the first optical system.

The divergence-angle conversion element 306 widens the divergence angle (conic angle) α of the laser beams 312a, 312b, and 312c that entered the element to produce laser luminous fluxes 313a, 313b, and 313c with a divergence angle of β which is larger than α.

The laser luminous fluxes 313a, 313b, and 313c reflected on the divergence-angle conversion element 306 are transmitted through a first projection optical system 307A that is a second optical system, and then reflected by an optical-path dividing member 316. The laser luminous fluxes 313a, 313b, and 313c from the optical-path dividing member 316 is transmitted through a second projection optical system 307B, and then reach a scanned surface 308 that is a real display surface observed by a user, such as a screen.

The second scanning optical system 305B and the first projection optical system 307A constitute a single optical system which has two functions.

Figure 11:
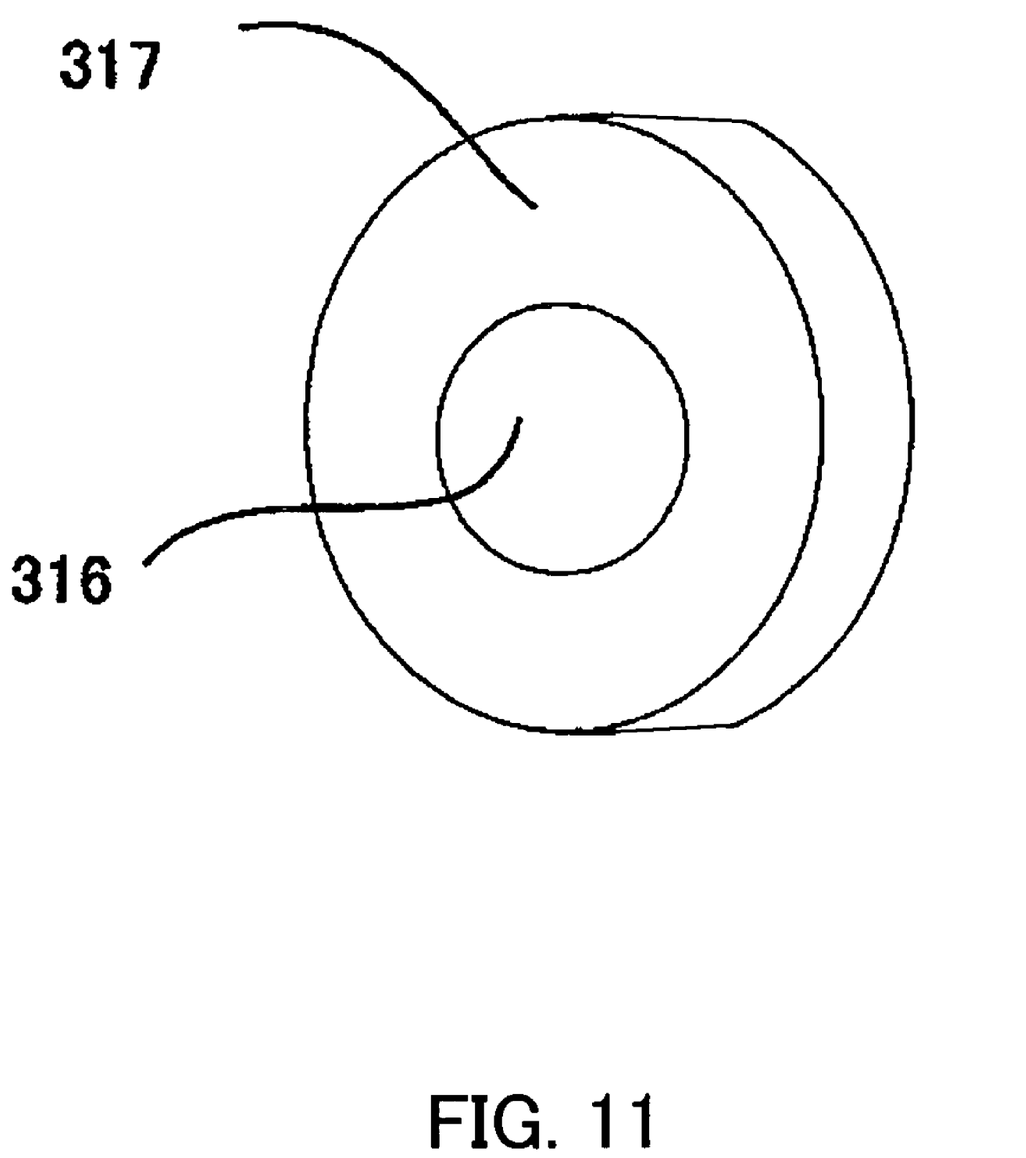
FIG. 11 is an explanatory diagram showing the optical-path dividing member used in Embodiment 3.

The optical-path dividing member 316 is arranged substantially at the aperture stop position of the projection optical system 307 (307A and 307B), and switches the optical path of the luminous flux progressing to the conjugate point 307 which is substantially conjugated with the scanning point of the two-dimensional scanning device 304 and the optical path of the luminous flux progressing to the scanned surface 308. FIG. 11 shows an example of the optical-path dividing member 316, the member being constituted by a mirror having an opening 316a in its center, or the like.

As described above, this embodiment adopts a schlieren optical system which divides the optical path in the vicinity of the aperture stop position of the projection optical system.

The two-dimensional scanning device 304 is constituted by a horizontal scanning mirror and a vertical scanning mirror as Embodiments 1 and 2. The image forming method of this embodiment is the same as Embodiment 1.

In this embodiment, the divergence-angle conversion element 306 makes the divergence angles (convergence angles) of the luminous fluxes (diffracted light components) impinging on the scanned surface 308 different from each other, thereby making it possible to reduce the speckle noise.

In this embodiment, the speckle pattern is changed dynamically by the reciprocating motion (or rotary motion) of the divergence-angle conversion element 306 in the direction shown by the arrow 306a via the driving mechanism 315. Thereby, it is possible to reduce the speckle noise.

Although the light source is one laser source in this embodiment, it is possible to project full-color images by using three laser sources of red, blue, and green. Further, each color laser source may include plural laser sources. In addition, using the red, blue, and green laser sources makes the speckle noise more unnoticeable than a case where only one laser source is used. Moreover, the combination of these colored lasers and a multimode laser which oscillates plural wavelengths can provide a higher speckle reduction effect.

As described above, according to each embodiment, it is possible to realize a laser scanning displaying optical system with a simple configuration and capable of projecting images without using a light modulator. Further, since the divergence-angle conversion element widens the incident angle (divergence angle) of the luminous flux on the scanned surface which is observed by users, in other words, plural light components with different incident angles on the scanned surface are generated, it is possible to reduce the speckle noise. In addition, the divergence-angle conversion element disrupts the polarization state which a laser beam generally has, thereby making it possible to reduce the speckle noise.

Moreover, the divergence-angle conversion element and the scanned surface have a conjugate relationship via the second optical system, and the divergence-angle conversion element can be moved, thereby the speckle pattern being changed dynamically. Therefore, the temporal overlap effect of these speckle patterns can reduce the speckle noise efficiently.

Furthermore, since the reflective divergence-angle conversion element folds the optical path of the displaying optical system, it is possible to realize a more compact displaying optical system.

Furthermore, using a schlieren optical system as the second optical system makes it possible to realize a compact displaying optical system with a low loss of light amount.

In short, according to each embodiment, the displaying optical system can reduce the speckle noise to display high quality images while it is a compact optical system with a low loss of light amount. Further, the displaying optical system requires no one-dimensional and two-dimensional light modulator.

In addition, although the laser light was used as coherent light in each of the above-mentioned embodiments, other coherent light may be used in the present invention.

This application claims a foreign priority benefit based on Japanese Patent Applications No. 2004-236839, filed on Aug. 16, 2004, which is hereby incorporated by reference herein in its entirety as if fully set forth herein.

What is claimed is:

1. A displaying optical system comprising:
a light source which emits a modulated coherent light;
a scanning device which scans the light from the light source;
a first optical system which causes the light from the scanning device to form an intermediate image;
a second optical system which causes the light from the intermediate image to form an image on a real display surface; and
an optical element arranged in between the first and second optical systems configured to widen the divergence angle of the light emerged from the first optical system so that the divergence angle of the light emerged from the optical element toward the second optical system is wider than the incident angle of the light on the optical element incident from the first optical systems,
wherein the second optical system establishes a conjugate relationship between the optical element and the display surface, and the optical element is movable in a plane where the intermediate image exists.

2. The displaying optical system according to claim 1, wherein the optical element is arranged at the position of the intermediate image or at the vicinity thereof.

3. The displaying optical system according to claim 1, wherein the optical element has a diffractive effect on the light.

4. The displaying optical system according to claim 1, wherein the optical element reflects the light.

5. The displaying optical system according to claim 1, wherein the second optical system is a schlieren optical system.

6. An image projection apparatus comprising:
the display optical system according to claim 1; and
a modulator which modulates the light source in accordance with an input signal.

7. An image displaying system comprising:
the image projection apparatus according to claim 6; and
an image-signal supplying apparatus which supplies an image signal to the image projection apparatus.

8. A displaying optical system comprising:
a light source which emits a modulated coherent light;
a scanning device which scans the light from the light source;
a first optical system which causes the light from the scanning device to form an intermediate image;
a second optical system which causes the light from the intermediate image to form an image on a real display surface; and
an optical element arranged in between the first and second optical systems configured to increase the numerical aperture of the second optical system on its incident side more than that of the first optical system on its emergent side,
wherein the second optical system establishes a conjugate relationship between the optical element and the display surface, and the optical element is movable in a plane where the intermediate image exists.

9. The displaying optical system according to claim 8, wherein the optical element is arranged at the position of the intermediate image or at the vicinity thereof.

10. The displaying optical system according to claim 8, wherein the optical element has a diffractive effect on the light.

11. The displaying optical system according to claim 8, wherein the optical element reflects the light.

12. The displaying optical system according to claim 8, wherein the second optical system is a schlieren optical system.

13. An image projection apparatus comprising:
the display optical system according to claim 8; and
a modulator which modulates the light source in accordance with an input signal.

14. An image displaying system comprising:
the image projection apparatus according to claim 13; and
an image-signal supplying apparatus which supplies an image signal to the image projection apparatus.

15. A displaying optical system comprising:
a light source which emits a modulated coherent light;
a scanning device which scans the light from the light source;
a first optical system which causes the light from the scanning device to form an intermediate image;
a second optical system which causes the light from the intermediate image to form an image on a real display surface; and
an optical element arranged in between the first and second optical systems configured to generate plural light components that impinge on the display surface and have divergence angles different from each other,
wherein the second optical system establishes a conjugate relationship between the optical element and the display surface, and the optical element is movable in a plane where the intermediate image exists.

16. The displaying optical system according to claim 15, wherein the optical element is arranged at the position of the intermediate image or at the vicinity thereof.

17. The displaying optical system according to claim 15, wherein the optical element has a diffractive effect on the light.

18. The displaying optical system according to claim 15, wherein the optical element reflects the light.

19. The displaying optical system according to claim 15, wherein the second optical system is a schlieren optical system.

20. An image projection apparatus comprising:
the display optical system according to claim 15; and
a modulator which modulates the light source in accordance with an input signal.

21. An image displaying system comprising:
the image projection apparatus according to claim 20; and
an image-signal supplying apparatus which supplies an image signal to the image projection apparatus.

* * * * *